United States Patent [19]

Pallo et al.

[11] 3,950,259

[45] Apr. 13, 1976

[54] POURABLE GRANULATED SILICEOUS INSULATION

[75] Inventors: John M. Pallo, Englewood; Donald J. Fischer, Sedalia, both of Colo.

[73] Assignee: Johns-Manville Corporation, Denver, Colo.

[22] Filed: May 29, 1973

[21] Appl. No.: 365,002

Related U.S. Application Data

[63] Continuation-in-part of Ser. No. 281,100, Aug. 16, 1972, abandoned.

[52] U.S. Cl.................................. 252/62; 252/385
[51] Int. Cl.² ........................................ C04B 43/00
[58] Field of Search............................. 252/62, 385

[56] References Cited
UNITED STATES PATENTS

| | | | |
|---|---|---|---|
| 2,808,338 | 10/1957 | Bruno et al. | 252/62 X |
| 2,882,254 | 4/1959 | Kloepfer et al. | 252/385 X |
| 3,055,831 | 9/1962 | Barnett et al. | 252/62 |
| 3,169,927 | 2/1965 | Matsch | 252/62 |
| 3,176,354 | 4/1965 | Blau et al. | 252/62 X |

*Primary Examiner*—Benjamin R. Padgett
*Assistant Examiner*—E. A. Miller
*Attorney, Agent, or Firm*—James W. McClain; Robert M. Krone

[57] ABSTRACT

A thermal insulation composition is described which is dry, free-flowing, granular, and has a thermal conductivity approximately that of dry still air. The composition contains two granular siliceous materials and a granular opacifier. The first siliceous material is coarser and denser, and provides the principal bulk density of the final mixture. The second siliceous material is quite fine, and provides the principal free-flowing properties of the mixture. In a preferred embodiment a third siliceous material is also included to increase the overall surface area.

13 Claims, No Drawings

POURABLE GRANULATED SILICEOUS INSULATION

CROSS-REFERENCE TO RELATED APPLICATION

The application is a continuation-in-part of application Ser. No. 281,100, filed Aug. 16, 1972, and now abandoned.

BACKGROUND OF THE INVENTION

The invention herein relates to free-flowing particulate thermal insulating materials.

The use of siliceous materials for thermal insulation is quite common and many varieties of siliceous insulations are commercially available. In most cases these insulating materials are sold as preformed shapes or as moldable plastic materials. In these forms they are readily attached to most pipes, vessels, etc., which are to be insulated. In some cases, however, the pipe, pipe fitting, or other apparatus which is to be insulated is in an inaccessible position or is of a complex shape. In either case, the system is not amenable to the use of conventional preformed or plastic molded insulations.

In order to overcome these difficulties, pourable or free-flowing insulating materials have been developed. These are commonly particulate, granular, or powdered materials which can be poured dry into the enclosed available space surrounding the system to be insulated. Being free flowing, the granular insulation can be made to completely fill the enclosing space and to conform to the various irregularities in the surface to be insulated.

Such pourable insulations would find use, for instance, for insulating the complex piping in spacecraft and missiles. Inaccessible or compartmented structures such as ship bulkheads or double walls of insulated trucks and railroad cars can also be filled with granular insulation, often at a substantial saving in both construction time and expense over the use of preformed slab insulation. Further, reaction vessels such as those used in chemical plants and petroleum refineries can often be more easily and inexpensively insulated by being surrounded by a simple cylindrical hollow shell filled with granular insulation than by use of block insulations curved to fit the various irregularities of the vessel.

In determining the efficiency of thermal insulation, the thermal conductivity of the insulation in question is generally compared against the thermal conductivity of dry still air at the same temperature. While some insulations have been developed which have thermal conductivities lower than that of dry still air (see, for instance, U.S. Pat. Nos. 2,808,338; 2,811,457 and 3,055,831), most conventional insulations have thermal conductivities two or three times greater than that of dry still air. A thermal insulation that approaches or equals the thermal conductivity of dry still air is therefor considered to be a very superior insulation.

SUMMARY OF THE INVENTION

The invention herein is a dry, free-flowing siliceous insulation material. It has a thermal conductivity significantly lower than most conventional thermal insulations and one which equals or approaches that of dry still air at most temperatures up to about 800°F. The composition claimed herein consists essentially of 60 to 94 weight percent of a first siliceous material, 1 to 10 weight percent of a second siliceous material, and 5 to 30 weight percent of an opacifier. The first siliceous material is a particulate material having a silica content of at least 85%, a bulk density of 10 to 15 lb/ft$^3$, an average particle size of 50 to 100 microns and a B.E.T. surface area of at least 175 m$^2$/g. The second siliceous material is also a particulate material having a silica content of at least 85%, a bulk density of 0.5 to 2.5 lb/ft$^3$, an average particle size of 1 to 10 microns and a B.E.T. surface area of 80 to 150 m$^2$/g. The opacifier is also a particulate material wherein the individual particles are each of a size in the range of from 10 to 80 microns. In a preferred embodiment, a third siliceous material is also included in an amount of from 0.1 to 10 weight percent to enhance the surface area of the composition. The third siliceous material is a particulate material having a silica content of at least 90%, a bulk density of 0.5 to 3.0 lb/ft$^3$, an average particle size of 0.005 to 0.1 microns, and a B.E.T. surface area of at least 150 m$^2$/g.

DETAILED DESCRIPTION OF THE INVENTION

The invention herein is an insulation composition in dry, pourable, free-flowing form. It has a thermal conductivity considerably less than that of most conventional preformed or plastic insulations. Over a significant portion of the applicable temperature range, the thermal conductivity equals or approaches that of dry still air, thus indicating the highly efficient and superior nature of the granular insulation of this invention.

The insulating composition claimed herein is a dry, free-flowing siliceous composition having low thermal conductivity, which consists essentially of 60 to 94 weight percent of a first siliceous material, 1 to 10 weight percent of a second siliceous material and 5 to 30 weight percent of an opacifier; the first siliceous material being a particulate material having a silica content of at least 85%, a bulk density of 10 to 15 lb/ft$^3$, an average particle size of 50 to 100 microns and a B.E.T. surface area of at least 175 m$^2$/g; the second siliceous material being a particulate material having a silica content of at least 85%, a bulk density of 0.5 to 2.5 lb/ft$^3$ an average particle size of 1 to 10 microns and a B.E.T. surface area of at least 80 to 150 m$^2$/g; and the opacifier being a particulate material having individual partilcle sizes in the range of from 10 to 80 microns. In a preferred embodiment, a third siliceous material is also included in an amount of from 0.1 to 10 weight percent to enhance the surface area of the composition. The third siliceous material is a particulate material having a silica content of at least 90%, a bulk density of 0.5 to 3.0 lb/ft$^3$, an average particle size of 0.005 to 0.1 microns, and a B.E.T. surface area of at least 150 m$^2$/g. (All percentage concentrations stated herein are on a dry weight basis.)

The first siliceous material used in the composition herein is a granular material containing at least 85% silica, and preferably at least 90%, by weight. The siliceous material may also contain small amounts of other oxides such as aluminum, calcium oxide, ferric oxide, magnesium oxide, potassium oxide and titanium dioxide. In addition, small amounts of organic materials, chemically or physically combined water, and other vaporizable materials may also be present; these may, if desired, be driven off by heating the siliceous material to a suitable temperature. The first siliceous material is the most dense of the siliceous materials here present. It is this material which essentially provides the required bulk density of the total granular insulation. For insulations of this type it is generally considered advantageous for the apparent density to be on the order of about 12 to 13 lb/ft³ or approximately 200 grams per liter. Consequently, the first siliceous material will have a bulk density in the range of from 10 to 15 lb/ft³, preferably 12 to 13 lb/ft³.

Since it is this component which provides the main bulk of the insulation it will also be the coarser in texture of the two siliceous materials. Average particle size will normally be in the range of from 50 to 100 microns (or a Tyler Standard Sieve mesh of between about 150 and 325 mesh), and preferably 60–95 microns.

The first siliceous material will also usually have a relatively high surface area. This provides for an irregular surface configuration incorporating numerous dead air spaces, thus contributing to the low thermal conductivity of the bulk materials. Consequently, the first siliceous material used herein will have a surface area of at least about 175 m²/g, as measured by the B.E.T. method, and preferably at least about 200 m²/g.

The second siliceous material used herein is somewhat similar to the first described above but differs in several important respects. The purpose of the second siliceous material is to provide good flow characteristics for the dry mixture of components. Consequently, its bulk density and particle size will be considerably less than those of the first siliceous material. The bulk density of the second siliceous material will be only about 0.5 to 2.5 lb/ft³, preferably 1.0 to 2.2 lb/ft³, while the average particle size will only be of from 1 to 10 microns, preferably 1 to 5 microns.

The chemical composition of the second siliceous material will be very similar to that of the first. The silica content by weight will be at least 85% and preferably at least 90%. The material may contain small portions of the metallic oxides listed above as well as the small amounts of organic materials and/or water also described above.

The surface area of the second siliceous material need not be as great as that of the first siliceous material since the second siliceous material is present in a much smaller proportion. Consequently, the effect on the overall thermal conductivity of the reduced surface area of the second siliceous material is not particularly significant. Therefore, the B.E.T. surface area of the second siliceous material is usually only at least about 80 m²/g and preferably 80 to 150 m²/g.

The first siliceous material will be present in a concentration of from 60 to 94 weight percent, preferably 65 to 80 weight percent. The second siliceous material will be present as 1 to 10 weight percent, preferably 4 to 8 weight percent of the overall composition. The opacifier will be present as 5 to 30 weight percent, preferably 10 to 25 weight percent.

The third component of the composition herein is an opacifier. This material contributes to the overall thermal conductivity of the material by reducing or reflecting infrared and thermal radiation through the material. The functional properties of opacifiers are well known. Typical materials which are entirely suitable as opacifiers in this composition are any solid materials which can be comminuted to the desired particulate size and which will not be adversely affected by the temperatures involved in service. Typical materials include silicon, titanium dioxide, zirconium oxide, and the like. In addition, mixtures of opacifiers may be used. Of the particular opacifiers mentioned, titanium dioxide is preferred.

The opacifier must be present as a particulate material in which essentially all the individual particles are each of a size in the range of from 10 to 80 microns, preferably 15 to 50 microns. Where the opacifier particles are smaller than this range, the free-flowing nature of the material is seriously degraded.

In a preferred embodiment, the composition also contains a third siliceous material, selected to enhance the surface area of the overall composition. This material is also a particulate material consisting of relatively pure silica, i.e., being at least 90%. Preferably the material contains at least 98% silica. Impurities, both organic and inorganic, are similar to those present in the other siliceous materials.

The bulk density of the third siliceous material will be in the range of 0.5 to 3.0 lb/ft³, preferably 1.5 to 2.5 lb/ft³. This material is in very finely divided form, having an average or nominal particle size of 0.005 to 0.1 microns, preferably about 0.010 to 0.015 microns. Since its purpose in the composition is to enhance the total surface area, its B.E.T. surface area is at least 150 m²/g, and preferably is 175 to 225 m²/g. Typical of such a material is a fumed silica sold by Cabot Corp. under the trademark "Cab-O-Sil", grade M-5. The third siliceous material will be present as 0.1 to 10 weight percent, preferably 1 to 8 weight percent, of the overall composition.

The components of this composition may be blended and thoroughly mixed by any convenient dry mixing technique. The particular technique and apparatus adopted will be such as to be capable of producing a homogeneous mixture even though the particle sizes of the components are significantly different. The factors to be considered in selecting proper equipment and mixing techniques are well known in the art and need not be described here. The various factors to be considered as well as exemplary equipment are all described and illustrated in standard texts such as that by Perry, *Chemical Engineer's Handbook* (3rd edn., 1950), section 17.

The thermal conductivity of the mixtures of this composition will be in the range of about 0.25 to 0.30 BTU-in/hr-ft²-°F at 300°F to about 0.40 to 0.50 BTU-in/hr-ft²-°F at 800°F. This compares very favorably with the thermal conductivity of dry still air, which ranges from about 0.24 at 300°F to about 0.36 at 800°F. It is also considerably better than the general thermal conductivities of most conventional thermal insulations, as illustrated by the graph in aforesaid U.S. Pat. No. 3,055,831.

EXAMPLE 1

A composition was prepared containing 70 weight percent of a first siliceous material, 5 weight percent of a second siliceous material and 25 weight percent of a titanium dioxide opacifier. The first siliceous material was a granular siliceous material containing approximately 93% silica, having an average particle size of 80 microns, a B.E.T. surface area of 250 m²/g and a bulk density of approximately 12.5 lb/ft³. This component was a commercial material sold under the trademark "Sipernat 22" by Degussa, Inc. The second siliceous material had a silica content of approximately 92%, an average particle size of 3 microns, a bulk density of approximately 1.6 lb/ft³ and a B.E.T. surface area of 110 m²/g. This material was a commercial material also sold by Degussa, Inc., under the trademark "Sipernat 17".

The titanium dioxide was a commercial high purity titania containing 97–99% titanium dioxide. Its particle size was all minus 325 mesh or less than 43 microns. Minimum particle size was greater than 5 micron.

These materials were mixed thoroughly with a commercial Henschel mixer at 1,800 rpm for a period of 5 minutes. The blades of the Henschel mixer were adjusted to the lowest position in order to prevent any batch material from settling out and remaining at the bottom of the mixer.

The pourability of the formulation was determined using A.S.T.M. test method D-1895 (Method A). A 32 gram sample was aerated and then loaded into a funnel. The amount of time required for this 32 grams of material to flow completely out of the funnel was recorded and reported as the pourability rate.

The thermal conductivity of the sample was determined by the heat flow meter method (A.S.T.M. test method C-518) at mean temperatures of 300°F, 500°F and 800°F. The results of these tests are all reported in the Table below.

EXAMPLE 2

A composition similar to that of Example 1 was prepared, with this composition containing 68 weight percent of "Sipernat 22", 7 weight of "Sipernat 17" and 25 weight percent of the titania opacifier. The pourability rate and the thermal conductivity at the stated temperatures were determined and also are reported in the Table.

TABLE

| Example | Pourability Rate, Sec. | Thermal Conductivity, BTU-in/hr-ft$^2$-°F | | |
|---|---|---|---|---|
| | | 300°F | 500°F | 800°F |
| 1 | 45 | 0.27 | 0.30 | 0.48 |
| 2 | 15 | 0.26 | 0.29 | 0.48 |

For comparison purposes it will be noted from the graph in aforesaid U.S. Pat. No. 3,055,831 that the thermal conductivity of dry air at 300°F is 0.24, at 500°F is 0.29 and at 800°F is 0.36 BTU-in/hr-ft$^2$-°F. A comparison with the Table above will indicate clearly that at the lower temperatures the compositions of this invention closely approach and essentially equal the thermal conductivity of the dry still air. Even at the higher temperatures the thermal conductivity of the composition of the present invention is still significantly less than that of ordinary insulation materials. It is thus apparent that the compositions of this invention are superior insulation materials.

What is claimed is:

1. An insulating composition in dry, free-flowing form and having low thermal conductivity, which comprises:
    a. 60 to 94 weight percent of a first siliceous material, being a particulate material having a silica content of at least 85 weight percent, a bulk density of 10 to 15 lb/ft$^3$, an average particle size in the range of 50 to 100 microns, and a B.E.T. surface area of at least 175 m$^2$/g;
    b. 1 to 10 weight percent of a second siliceous material, being a particulate material having a silica content of at least 85 weight percent, a bulk density of 0.5 to 2.5 lb/ft$^3$, average particle size of 1 to 10 microns, and a B.E.T. surface area of 80 to 150 m$^2$/g; and
    c. 5 to 30 weight percent of a particulate opacifier having its individual particle size essentially all in the range of 10 to 80 microns.

2. The composition of claim 1 wherein said first siliceous material is present as 65 to 85 weight percent of said composition.

3. The composition of claim 2 wherein said first siliceous material has an average particle size of 60 to 95 microns.

4. The composition of claim 3 wherein said first siliceous material has a bulk density of 12 to 13 lb/ft$^3$.

5. The composition of claim 1 wherein said second siliceous material is present as 4 to 8 weight percent of said composition.

6. The composition of claim 5 wherein said second siliceous material has an average particle size of 1 to 5 microns.

7. The composition of claim 6 wherein said second siliceous material has a bulk density of 1.0 to 2.2 lb/ft$^3$.

8. The composition of claim 1 wherein said opacifier is selected from the group consisting of titanium dioxide, zirconium oxide, and silicon.

9. The composition of claim 8 wherein said opacifier is present as 10 to 25 weight percent of said composition.

10. The composition of claim 1 further comprising 0.1 to 10 weight percent of a third siliceous material, being a finely divided particulate material having a silica content of at least 90%, a bulk density of 0.5 to 3.0 lb/ft$^3$, an average particle size of 0.005 to 0.1 microns, and a B.E.T. surface area of at least 150 m$^2$/g.

11. The composition of claim 10 wherein said third siliceous material has a B.E.T. surface area of 175 to 225 m$^2$/g.

12. The composition of claim 10 wherein said third siliceous material has an average particle size of 0.010 to 0.015 microns.

13. The composition of claim 10 wherein said third siliceous material is present as 1 to 8 weight percent of the composition.

* * * * *